June 20, 1961 J. MAZZARINS 2,988,926
MASTER LINK
Filed July 28, 1958 2 Sheets-Sheet 1
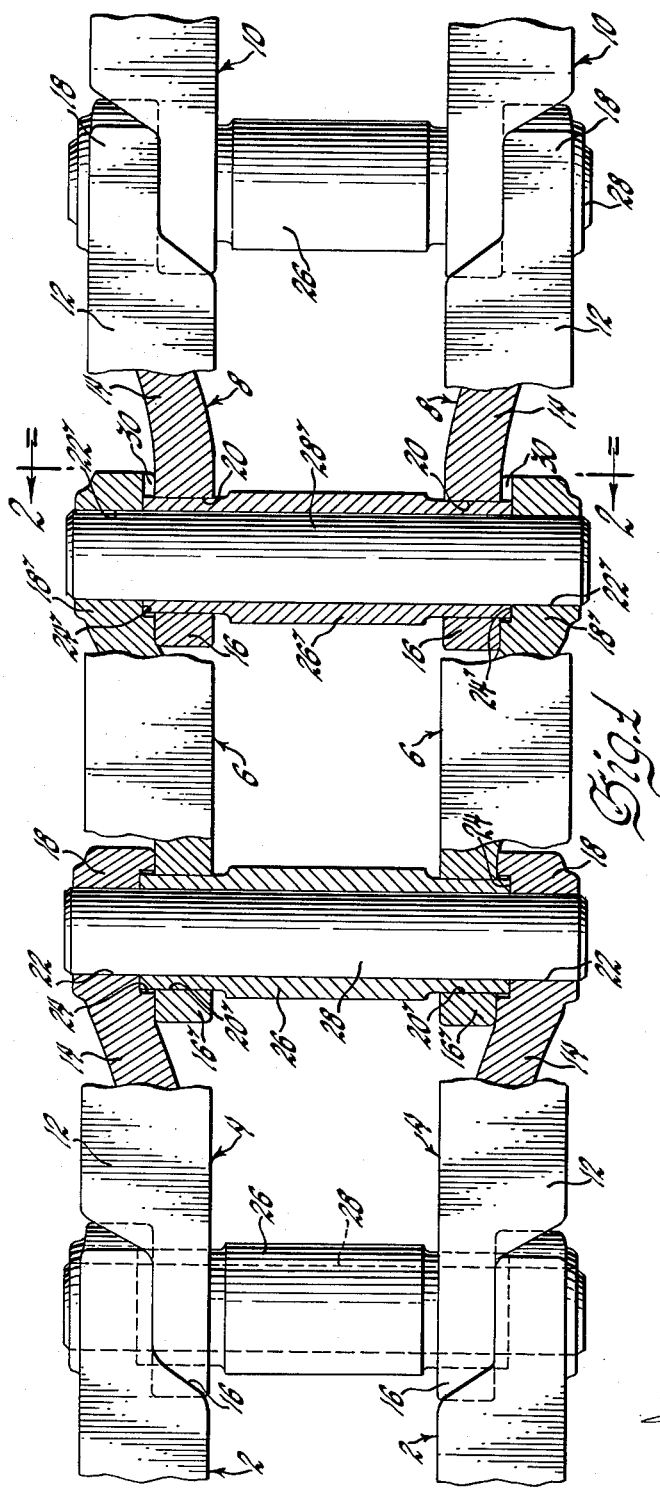
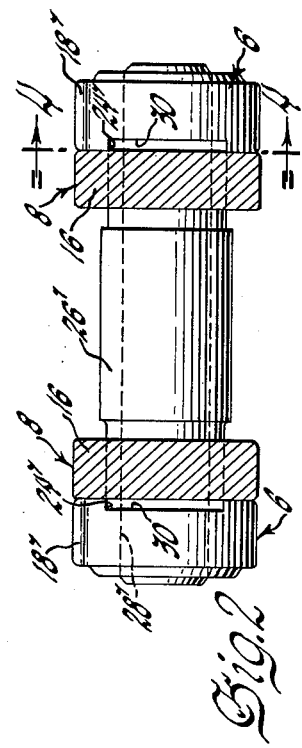
INVENTOR.
Janis Mazzarins
BY
R.F.Barnard
ATTORNEY June 20, 1961  J. MAZZARINS  2,988,926
MASTER LINK
Filed July 28, 1958  2 Sheets-Sheet 2

INVENTOR.
Janis Mazzarins
BY
R.F. Barnard
ATTORNEY

United States Patent Office 2,988,926
Patented June 20, 1961

2,988,926
MASTER LINK
Janis Mazzarins, Cleveland, Ohio, assignor to General Motors Corporation, Detroit, Mich., a corporation of Delaware
Filed July 28, 1958, Ser. No. 751,262
3 Claims. (Cl. 74—250)

This invention relates to a master link for joining the ends of a chain to make the latter endless and, in particular, to such a master link which is particularly useful when employed in an endless track of the type with which crawler tractors are normally equipped. This invention is particularly adapted for use with the articulated endless track of a crawler tractor and will be described with reference to such a use, although its adaptability to other similar uses will become more apparent as the description of the invention proceeds.

Conventional endless tracks heretofore employed with crawler tractors typically include a plurality of pairs of track links adapted to be connected in end-to-end relationship to form an articulated belt or chain to which track shoes are suitably secured. The ends of each pair of links are suitably apertured for alignment with mating ends of another adjacent pair of links for receiving link pin and bushing assemblies to form the articulated track. Normally, adjacent pairs of the links are articulably connected by a bushing extending with a press-fit through the openings in one end of one pair of links and laterally therebeyond into recesses around the openings in the ends of the mating pair of links, and a link pin extending through the bushing and therebeyond into the openings in the aforementioned mating pair of links where the pin is secured by a press-fit.

As the aforementioned conventional track is assembled, it will be apparent that the links of each pair of links become laterally fixedly spaced because of the pin and bushing connection. Therefore, in drawing the ends of the track together to form an endless track, it is impossible to use a standard bushing connection inasmuch as the latter projects laterally beyond the link ends in which it is secured so as to prevent drawing the ends of the track into side-by-side mating engagement so as to align the openings therein to receive the track pin. Because of this assembly difficulty in conventional tracks, it has been necessary to employ a bushing in the master track connection which is shorter than the standard bushing. The master bushing has been of such a length as to extend only between one pair of links and not laterally therebeyond into the recesses in the other pair of links so that the aforementioned one pair of links can be drawn into side-by-side mating engagement with the other pair of links to receive a master pin which extends through the bushing and is press-fit in the openings in the other pair of links to firmly secure the endless track together. Because the conventional master bushing has been shorter than the standard bushing, two spacer rings have been required in each master connection to fill the aforementioned recesses.

There are several disadvantages in such a conventional track. In the first place, a different size bushing must be employed in the master connection as compared to the standard connections. Secondly, a pair of spacer rings are required to fill the recesses in the pair of mating links which, in a standard connection, are filled by the lateral projections of the standard bushing. The bearing length of the master bushing is reduced thereby resulting in increased unit bearing pressure and, consequently, increased wear on the pin and bushing. Such wearing results in variation in the distance or pitch between the various link connections which increases sprocket wear. Additionally, dirt and other debris more easily finds its way past the link recess into the space between the master bushing and pin thereby increasing the wear on them.

It is, therefore, a principal object and feature of this invention to provide a master link which greatly facilitates the assembly of an endless chain as compared to conventional structures as aforedescribed.

It is yet another object and feature of this invention to provide a master link structure for an endless track of the type typically employed with crawler tractors in which spacer rings are not required in the master link connection.

It is another object and feature of this invention to provide a master link connection having improved wear characteristics resulting in less sprocket wear.

It is yet another object and feature of this invention to provide an endless track for a crawler tractor having a master link connection which employs a standard length bushing which will reduce the wear on the latter and the master pin by providing a greater bearing length while more positively isolating the articulated master connection from dirt and other debris.

In general, these and other objects of this invention are accomplished by providing a master link having an opening through one end of the latter for receiving a master link pin, and a recess formed in the side wall of the end of the master link surrounding the opening and adapted to be disposed laterally adjacent to the end of a mating link through which a bushing extends. The side wall of the aforementioned master link is cut away or relieved preferably generally longitudinally of the link body to a depth and width preferably at least equal to the depth and diameter of the aforementioned recess to form an access passage to the recess from the exterior of the link body. With a pair of the aforementioned master links laterally fixedly secured at one end of the track, the track ends may be drawn together and the final master connection made with little difficulty although a standard length bushing is utilized which projects laterally beyond the ends of the mating pair of links which are to be connected to the master link ends. The laterally projecting ends of the master bushing will readily pass through the access passages or relieved portions in the master link ends until the master bushing ends seat in the recesses in the master link ends thereby aligning the openings in the master link ends and the associated ends of the mating pairs of links. Thereafter, the master link pin may be inserted through the bushing and therebeyond so as to be received with a press-fit in the openings in the master link ends.

These and other features and objects of this invention will become more apparent hereinafter as the description of the invention proceeds, and in which reference is made to the following drawings in which:

FIGURE 1 is a fragmentary plan view, partially in section and partly broken away, illustrating a portion of an endless track of the type normally employed with crawler tractors and including the master link of this invention;

FIGURE 2 is a section taken on line 2—2 of FIGURE 1;

Figure 3:
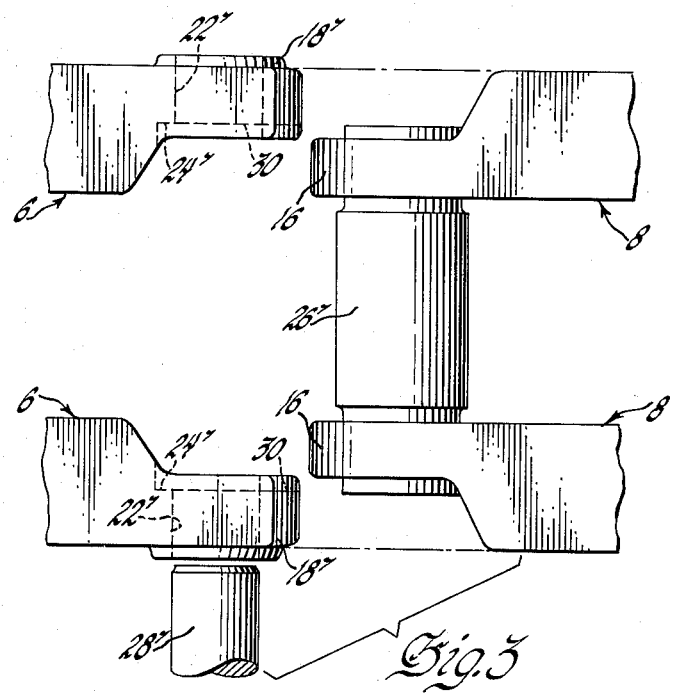
FIGURE 3 is a fragmentary exploded plan view illustrating the assembly of the master link connection.
Figure 4:
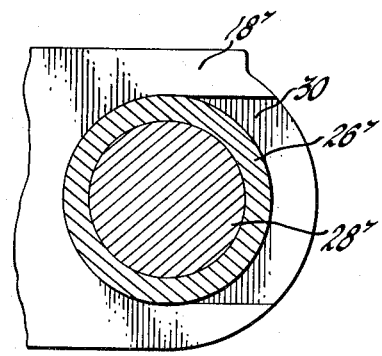
FIGURE 4 is a section taken on line 4—4 of FIGURE 2.

Referring now to the drawings, a portion of an endless track of the type employed with crawler tractors is shown in FIG. 1. This track may be seen to include a plurality of pairs of laterally fixedly spaced track links such as 2, 4, 6, 8 and 10 which are adapted to be articulably connected in end-to-end relationship. The pairs of links 2, 4, 8 and 10 are referred to hereinafter as standard links, while the master links of this invention are indicated at 6. As will be apparent to those skilled in the art, all of the standard links on a given side of the track are substantially identical to each other, while the links of each pair of standard links are subsantially mirror images of each other. Accordingly, like numerals in the description which follows indicate corresponding parts of the standard links and their connection to form laterally fixed spaced pairs of links. Additionally, inasmuch as the master links are similar to the standard links, primed numerals are employed in the description to indicate corresponding parts of the standard and master links and their connections.

Each link of each pair of standard links has a body portion including an inner edge wall or surface 12 adapted to be entrained about the driving sprocket and idler wheels of a crawler tractor and joined by a wall or web 14 to an outer edge wall or surface similar to the inner surface and to which track shoes may be suitably secured as will be obvious to those skilled in the art. The opposite end portions 16 and 18 of each standard link are laterally offset from each other and have openings 20 and 22, respectively, extending laterally therethrough. Each opening is adapted to be aligned with the opposite opening of an adjacent link for receiving link pin and bushing assemblies so as to connect the links together. The inner side wall of each of the ends 18 of the standard links 2, 4, 8 and 10 includes an annular recess 24 surrounding the opening 22 therein. In connecting the standard links together articulably, a bushing 26 is firmly secured as by a press-fit in the openings 20 in the end portions 16 and projects slightly laterally outwardly therefrom so as to seat in the recess 24 in the ends 18 of the links. A link pin 28 extends through the bushing 26 and laterally therebeyond for firm engagement as by a press-fit within the openings 22 in the ends 18 of the standard links. There is a slight clearance between the pin 28 and the bushing 26 so as to permit the pairs of standard links to articulate relative to each other.

The pair of master links 6 is substantially identical to the standard links previously described in that each of the master links includes a body portion having inner and outer surfaces or edges joined by a wall or web, and one end 16' having an opening 20' therethrough adapted to be aligned with the opening 22 in the end 18 of one of the adjacent pair of standard links 4. The ends 16' of the pair of master links are articulably connected to the ends 18 of the pair of standard links 4 in a manner identical to the connection of corresponding ends of the standard links. In other words, the bushing 26 is received with a press-fit in the openings 20' of the master links and extends therebeyond into the recesses 24 in the ends 18 of the standard pair of links 4. A pin 28 is then inserted with slight clearance through the bushing 26 and firmly secured as by a press-fit to the ends 18 of the standard pair of links 4 as aforedescribed.

The other ends 18' of the pair of master links 6 are laterally offset from the ends 16' thereof as with the standard links. Additionally, the end 18' of each master link is provided with an opening 22' therethrough surrounded by a recess 24' formed on the laterally inner side wall of this end of each master link. Unlike the standard links, however, the aforementioned side wall of each master link is cut away or relieved preferably to a depth and width at least equal to the depth and diameter of the recess 24' so as to form an access passage 30 opening from each recess substantially longitudinally outwardly from the master link end 18'. Thus, this passage is large enough to permit entry and passage therethrough of a master bushing 26' which is received with a press-fit in the openings 20 in the ends 16 of the standard pairs of links 8. The projecting ends of the master bushing 26' are seated in the recess 24' in each of the master links, and a master link pin 28' extends through the bushing and laterally therebeyond for firm engagement as by a press-fit in the openings in the ends 18' of the master links. Preferably, but not necessarily, the diameter of master pin 28' is less than that of the standard pins 28 so as to facilitate removal of the master pin from the master link ends 18' for disassembling the track from the tractor.

From the above description, it may thus be seen that the standard pins 28 and master pin 28' may be the same size, while the same is true of the standard bushings 26 and master bushing 26' although, as aforementioned, it is preferable to use a master pin of slightly smaller diameter so as to provide less interfering fit between the latter and the master link ends 18' for the purpose of disassembly. Additionally, and with reference to the foregoing comments as to conventional practice in this art, it is not necessary to employ spacer rings to fill the recesses 24' in the ends 18' of the pair of master links 6 inasmuch as the ends of the master bushing 26' project into these recesses. Therefore, according to this invention as it may be employed in one form, all of the parts can be standardized except for the ends 18' of the pair of master links 6 which are provided with an access passage or relieved portion 30 therein.

In order to further emphasize the advantages to be gained from employing a master link as aforedescribed, reference will be made to the assembly of such a track employing this master link connection. It will, of course, be obvious that numerous pairs of standard links such as 2, 4, 8 and 10 are first assembled with the track lying on the ground until the necessary standard links have been placed in the track so as to fit on the crawler tractor. In so assembling the standard links, the master pair of links 6 and adjacent pair of standard links 8, for example, will be at the ends of the track which now must be drawn together about the tractor drive and idler wheels to form the endless track. At this point, it will be noted that each link of the pair of standard links 8 is laterally fixedly spaced relative to the other, while this is also true of the pair of master links 6 as indicated in FIG. 3. The run of track is then assembled about the tractor drive and idler wheels and then the ends 16 of the pair of standard links 8 are drawn into telescopic side-by-side mating engagement with the ends 18' of the pair of master links 6 using a suitable tool or tools where required as is well known in the art. As the pair of master links 6 and pair of standard links are drawn together, the projecting ends of the bushing 26' pass through the access passages 30 in the master links until they seat within the recesses 24' in the master link ends at which time the openings 22' in the master links and openings 20 in the pair of standard links 8 are aligned. Thereafter, the master pin 28' is inserted through the master bushing 26' and received with a press-fit within the openings in the ends 18' of the pair of master links 6. The endless track is then completely assembled.

The advantages of such a master link connection with respect to standardization of parts and elimination of spacer rings has been referred to above. In addition, other advantages result due to the use of a longer master bushing 26' which will extend completely into the recesses 24' in the pair of master links 6. Thus, as compared to conventional tracks using shorter master bushings and spacer rings, a more effective seal is provided to prevent dirt and other debris from working past the recesses 24' into the area between the master pin 28' and bushing 26' thereby reducing wear on them. Moreover, due to the greater length of the master bushing 26' as compared to conventional master connections, decreased unit bearing pressure between the bushing and pin additionally reduces wear on them. As a result of reduction in wear, the pitch or distance between the respective pin and bushing assemblies remains substantially equal as when installed so as to reduce sprocket wear.

At this juncture, it may be observed that the foregoing description of an illustrative embodiment of the invention has been directed primarily to the use of a single pair of master links 6 in a run of endless track. However, it should be realized that more than one pair of master links may be employed in any given track. For example, circumstances of tractor operation may be encountered in which track failure occurs at which time it is necessary to cut out the defective links and replace them by new links which, it will be obvious, must be of the master link type due to the laterally fixedly spaced relation of each pair of links in the track which prevent telescoping the ends thereof into mating engagement unless a conventional short master bushing is employed or the master links of this invention are employed. Additionally, apart from replacement of links which fail, it will be quite apparent that a given track may be initially assembled using the master link of this invention.

Having described a preferred embodiment of this invention for illustrative purposes only, it will be realized that modifications thereof will now become apparent to those acquainted with this art. Therefore, it is to be understood that the invention is not to be limited by the embodiment described, but only by the claims which follow.

I claim:

1. A master link connection for an endless chain of the type comprising a plurality of pairs of relatively laterally fixedly spaced links articulately connected in end-to-end relation, said master link connection comprising a pair of master links connected in said chain, each of said master links having an opening extending laterally therethrough adjacent one end thereof for alignment with an opening adjacent one end of each of an adjacent pair of links, the inner side walls of said master links adjacent said ends being relieved to define access passages through said ends to and around said openings in the latter, a bushing secured in said openings of said adjacent pair of links and projecting laterally therebeyond, the projecting ends of said bushing being movable through said access passages into alignment with said master link openings upon drawing said ends of said master links and said adjacent pair of links together, and a master link pin extending through and beyond said bushing and firmly engaging said master link ends within the openings in the latter.

2. A master link connection for an endless track of type comprising a plurality of pairs of relatively laterally fixedly spaced links articulately connected in end-to-end relation, said master link connection comprising a pair of master links connected in said track, each of said master links having an opening extending laterally therethrough adjacent one end thereof for alignment with an opening adjacent one end of each of an adjacent pair of links, a recess in the inner side walls of said master links surrounding the openings through the latter, said inner side walls being relieved to define access passages through said master link ends to said recesses, a bushing secured in said openings of said adjacent pair of links and projecting laterally therebeyond, the projecting ends of said bushing being movable through said access passages to seat in said recesses and align said openings upon drawing said ends of said master links and said adjacent pair of links together, and a master link pin extending through and laterally beyond said bushing and firmly engaging said master link ends within the openings in the latter.

3. The invention as defined in claim 2 in which said access passages in said inner side walls are at least as deep and as wide as said recesses in said inner side walls.

References Cited in the file of this patent

UNITED STATES PATENTS

| | | |
|---|---|---|
| 336,921 | Jeffrey | Mar. 2, 1886 |
| 609,890 | Loos | Aug. 30, 1886 |
| 745,975 | Sweany | Dec. 1, 1903 |
| 955,377 | Brisse | Apr. 19, 1910 |
| 1,693,831 | Turnbull | Dec. 4, 1928 |
| 2,329,303 | Stewart | Sept. 14, 1943 |
| 2,823,081 | Mayo | Feb. 11, 1958 |